April 26, 1960 F. SCHÄFER 2,934,663
COMMUTATOR AND PROCESS OF MANUFACTURING THE SAME
Filed Aug. 30, 1957
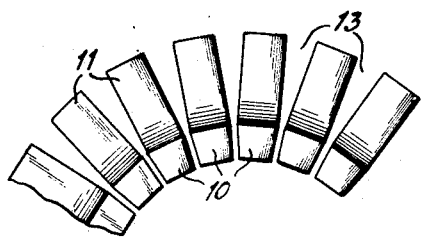
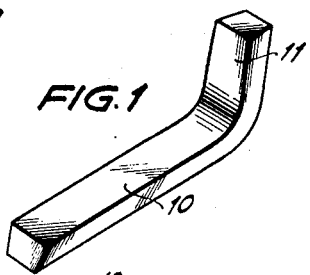
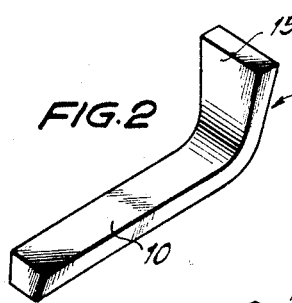
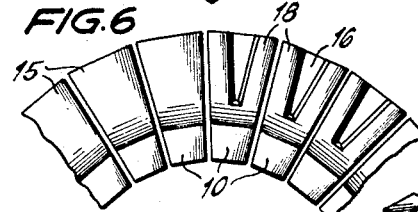
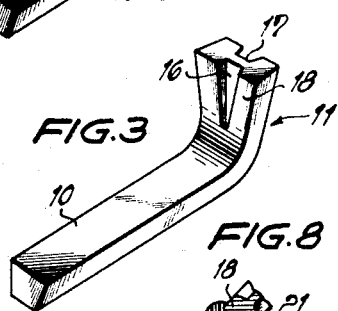
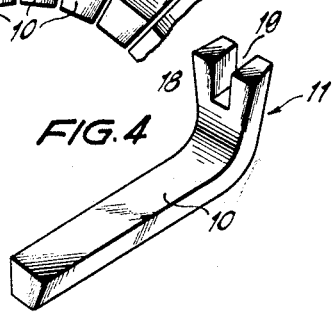
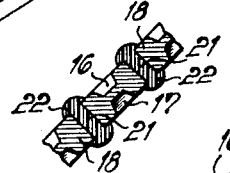
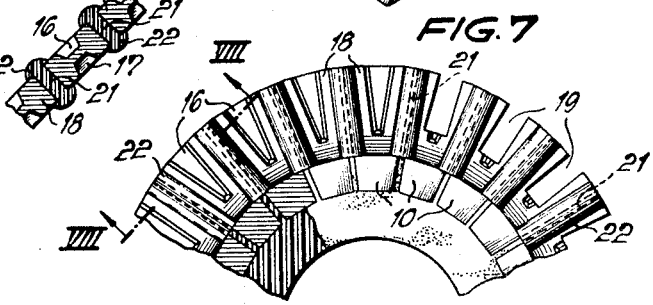
INVENTOR
Fridolin Schäfer
BY: Michael S. Stricker
ATTORNEY

United States Patent Office 2,934,663
Patented Apr. 26, 1960

2,934,663

COMMUTATOR AND PROCESS OF MANUFACTURING THE SAME

Fridolin Schäfer, Stuttgart, Germany, assignor to Robert Bosch G.m.b.H., Stuttgart, Germany Application August 30, 1957, Serial No. 681,395

Claims priority, application Germany September 8, 1956

4 Claims. (Cl. 310—235)

The present invention relates to electric motors.

More particularly, the present invention relates to commutators for electric motors.

At the present time commutators of electric motors are composed of elongated commutator segments arranged about an axis of a cylinder in side by side relation and having bent ends which extend radially from the segments so that the wiring of the armature may be connected with these ends. For this purpose the ends of the commutator segments are provided with narrow slits so that the ends of the coils of the armature may be placed in the slits in order to be fastened to the several commutator segments. These slits may be formed by sawing, for example. Because of the fact that the bent end portions of these commutator segments are only as wide as the commutator segments at their portions located in side by side relation, it is not possible to provide a very wide slit or anything except an extremely narrow slit in the free end portion of the commutator segments, and as a result the thickness of the wire used for the armature coils is in many cases undesirably limited.

One of the objects of the present invention is to overcome the above drawbacks by providing a commutator with segments which increase considerably the space available at each segment for the connection of the coils of an armature thereto, so that in this way the thickness of the wire used in the armature may be increased beyond what has heretofore been possible, and furthermore the security of the connection between the commutator segments and the armature coil as well as the ease with which the connection is made are greatly increased.

It is also an object of the present invention to provide a process for manufacturing a commutator according to the present invention.

A further object of the present invention is to provide commutator segments of the above type which need only have an extremely small amount of their material removed in order to provide the necessary slots or the like to receive the armature coil ends in order to connect the commutator segments with the armature coil.

With the above objects in view, the present invention includes in a process for manufacturing an electrical motor's commutator, the performing in any order of the steps of bending an end of an elongated commutator segment so that the latter is provided with a free end portion extending angularly from the remainder of the commutator segment, and then plastically shaping the free end portion of the commutator segment into a substantially fan-shaped configuration. Also, in accordance with the above objects the present invention includes in an electric motor a commutator composed of a plurality of elongated commutator segments arranged in side by side relation about the axis of a cylinder along which the commutator segments are located, all of these segments respectively having free end portions extending radially from the remainder of the segments and each being of a substantially fan-shaped configuration so that these free end portions of the commutator segments define almost a continuous flange, and a body of non-electrically-conductive plastic material is located in the spaces between the several commutator segments to unite them together into a common structure, the plastic material being located also in the spaces between the free end portions of the commutator segments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a commutator segment provided with a bent free end portion;

Fig. 2 is a perspective view of the commutator segment of Fig. 1 after it has been worked upon according to one feature of the present invention;

Fig. 3 shows the segment of Fig. 2 after it has been subjected to a further step of the process according to the present invention;

Fig. 4 shows the segment of Fig. 3 after it has been subjected to a still further step of the process of the present invention;

Fig. 5 illustrates in a fragmentary end view the manner in which commutator segments as shown in Fig. 1 appear when assembled together into a commutator;

Fig. 6 is an end view of commutator segments as shown in Figs. 2 and 3 assembled together into a commutator, Fig. 6 showing only these segments and being fragmentary;

Fig. 7 is a fragmentary end view of an almost finished commutator according to the present invention; and Fig. 8 is a fragmentary sectional view taken along line VIII—VIII of Fig. 7 in the direction of the arrows.

Fig. 1 of the drawings shows an elongated commutator segment 10 of trapezoidal cross sectional configuration, and this commutator segment 10 is provided with a bent free end portion 11 which extends angularly from the remainder of the commutator segment as illustrated in Fig. 1, the portion 11 making an angle of substantially 90° with the remainder of the commutator segment 10. An unillustrated end of a wire of an armature coil is adapted to be connected to the best end 11 of the commutator segment. When a plurality of commutator segments as shown in Fig. 1 are assembled together to form a single commutator and are maintained in spaced relation with respect to each other in a suitable unillustrated sleeve or the like so as to provide the necessary spaces to receive the electrically non-conductive plastic material which insulates the segments from each other, the free ends 11 of the commutator segments will extend radially away from the axis about which the segments are distributed, and as is shown in Fig. 5 there will be provided between the free end portions 11 a plurality of substantially wedge-shaped gaps 13.

It is desirable to make as much use as possible of the gaps 13 for the purpose of connecting the ends of the armature coils to the ends 11 of the commutator segments, and thus in accordance with the present invention the ends 11 of the commutator segments 10 are provided with the substantially fan-shaped configuration shown at the left side of Fig. 6 where the end portions 15 are shown occupying sector-shaped spaces and arranged along a circle, so that the free end portions 15 form substantially a continuous flange. These free end portions 15 are also shown at the right side of Fig. 6, but at the right side of Fig. 6 they are illustrated as being provided with notches 16, as described below. Fig. 2 shows the difference between the commutator segments of Figs. 1 and 5 and that of Fig 6. The free end portion 11 of the commutator segment of Fig. 1 has been compressed in a suitable upsetting machine so as to have its material spread out into the substantially fan-shaped configuration shown in order to provide the segment 10 with the free end portion 15 shown in Fig. 2.

During the plastic shaping of the free end portion 11 of the commutator segments it may be simultaneously pressed with suitable dies so as to be provided in its opposite faces with notches 16 and 17, respectively, as indicated in Fig. 3, and these notches greatly reduce the amount of material which is removed from the free end portion 11 in order to provide a notch or slot 19 (Fig. 4) at which a connection to a wire of an armature coil is made. The notches or depressions 16 and 17 reduce the extent of material removed to form the cutout 19 to such an extent that the free end portion 11 may be spread to the substantially fan-shaped configuration indicated in Figs. 6 and 7 without having any significant reduction in its thickness. It will be noted from Figs. 6 and 7 that the end portions 18 formed by the depressions 16 and 17 as well as the spreading of the end portion 11 into the substantially fan-shaped configuration have their depressions 16 and 17 in substantially wedge-shaped configuration. The shape of the cutouts 19 which may be formed with a suitable sawblade is apparent from Figs. 4 and 7.

When the commutator segments as described above are positioned properly with respect to each other in a suitable sleeve or the like which is not illustrated in the drawings, a body of electrically non-conductive plastic material 20 is placed while in plastic condition in engagement with the segments and the material 20 fills the spaces between the segments as well as between the bent free end portions thereof (Fig. 8), and in this way the segments are insulated from each other while at the same time being united so as to form a common structural member. It will be noted from Fig. 8 that the plastic material 20 not only fills the gaps 21 (Fig. 7) between the free end portions 18 of the several commutator segments, but in addition the plastic material overlaps the opposed faces of the end portions 18, as is shown most clearly in Fig. 8. The plastic material projects axially beyond the respective opposed faces of the end portions of adjacent commutator segments and forms insulating ridges 22. In this way the continuous flange which is formed by the plastic material and the free end portions has considerable strength. When the plastic material hardens the entire structure is quite strong and rigid and all of the parts thereof are securely united together. The plastic material in the gaps 21 and of ridges 22 prevents solder used for making connections with the armature coil from bridging a pair of commutator segments. The slot 19 of each segment is used to receive an end of an armature coil. It is apparent that because of the fan-shaped configuration of the free ends of the commutator segments so that these free ends occupy the spaces 13 of Fig. 5 it is possible to make the cutouts 19 wider than would otherwise be possible, and thus the connection of the wires to the commutator segments is greatly facilitated and in addition it is possible to use thicker wire than would otherwise be possible. Furthermore, because of the larger commutator end portions provided with the present invention as well as the possibility of larger cutouts 19, it is possible to connect each commutator segment with more than a pair of wire ends. For example it is possible to connect the individual commutator end portions with four coil ends.

The opposite faces of the free end portion of the commutator segment are pressed toward each other in a suitable squeezing machine which causes the material of the end portion to become spread apart into the fan-shaped configuration shown in the drawings, so that in this way the end portion of the segment is plastically shaped to the desired configuration, and of course at the same time the depressions 16 and 17 may be formed, so that in this way not only can the original thickness of the segment end portion be maintained but also the amount of material removed is reduced to a minimum when a saw or the like is applied for providing the cutout 19, and thus the soldered connections of the wires to the commutator segments can be very efficiently made because the thickness of the end portions of the commutator segments is still substantial enough to provide the best possible electrical soldered connections.

It is apparent that the squeezing of the end portion 11 into the fan-shaped configuration can take place either before or after or simultaneously with the bending of the free end portion 11 from the remainder of the commutator segment 10, and also the depressions 16 and 17 may be pressed into the material of the end portion 11 at any time, which is to say either before or after the end portion 11 is bent and spread or simultaneously with the bending and spreading of the end portion. Thus, in the claims which follow the steps of the process are recited as being performed in any order, and the expression "in any order" is intended to mean not only in any sequential order but also simultaneously.

It will be understood that each of the elements described above, or two or more together, may also find a useful application in other types of electrical motors differing from the types described above.

While the invention has been illustrated and described as embodied in commutators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing a commutator for an electric motor, performing in any order the steps of bending an end portion of an elongated commutator segment so that the bent end portion thereof extends angularly from the remainder of the commutator segment; and plastically shaping the end portion of the commutator segment into a substantially fan-shaped configuration.

2. In a process for manufacturing a commutator for an electric motor, performing in any order the steps of bending an end portion of an elongated commutator segment so that the bent end portion thereof extends angularly from the remainder of the commutator segment; plastically shaping the end portion of the commutator segment into a substantially fan-shaped configuration by pressing a notch into at least one face of said end portion of said commutator segment.

3. In a process for manufacturing a commutator for an electric motor, performing in any order the steps of bending an end portion of an elongated commutator segment so that the bent end portion thereof extends angularly from the remainder of the commutator segment; plastically shaping the end portion of the commutator segment into a substantially fan-shaped configuration by pressing a pair of notches respectively in the opposite faces of said end portion of said commutator segment.

4. In a commutator for an electric motor, in combination, a plurality of commutator segments arranged substantially axially in side by side relation along a predetermined cylinder, and said segments respectively having free end portions extending angularly from said segments at one end of said cylinder, said end portions extending outwardly away from the axis of said cylinder and being of a substantially fan-shaped configuration so that said end portions cooperate together to form a substantially continuous flange at one end of said segments; and a body of non-electrically-conductive plastic located in the spaces between said commutator segments and uniting them together into a common structural member, said plastic also being located in the spaces between said end portions of said segments to provide with said end portions a continuous flange, and the plastic material overlapping the opposed faces of said end portions of said segments and axially projecting beyond said opposed faces, whereby insulating ridges are formed between the exposed surfaces of said end portions.

References Cited in the file of this patent

UNITED STATES PATENTS

| | | |
|---|---|---|
| 1,578,793 | Apple | Mar. 30, 1926 |
| 2,256,321 | McCusker | Sept. 16, 1941 |
| 2,322,020 | Hemphill | June 15, 1943 |
| 2,421,845 | Moeller | June 10, 1947 |
| 2,688,793 | Carlson | Sept. 14, 1954 |

FOREIGN PATENTS

| | | |
|---|---|---|
| 378,253 | Great Britain | Aug. 11, 1932 |